United States Patent [19]

Takahashi et al.

[11] Patent Number: 5,997,188

[45] Date of Patent: *Dec. 7, 1999

[54] PLANE SHUTTER

[75] Inventors: Kunioki Takahashi; Toshiaki Hirai; Makoto Mikami, all of Yotsukaido, Japan

[73] Assignee: Seiko Precision Inc., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/903,505

[22] Filed: Jul. 30, 1997

[30] Foreign Application Priority Data

Jul. 31, 1996 [JP] Japan ................................. 8-202421

[51] Int. Cl.$^6$ .................................................. G03B 17/24
[52] U.S. Cl. ............................................... 396/487
[58] Field of Search ..................... 396/487, 488

[56] References Cited

U.S. PATENT DOCUMENTS 4,394,082 7/1983 Senuma et al. ...................... 396/488
4,401,380 8/1983 Sato et al. ........................... 396/488

Primary Examiner—David M. Gray
Attorney, Agent, or Firm—Adams & Wilks

[57] ABSTRACT

A focal plane shutter has a base plate provided with a shutter opening, opening and closing sector groups each having a plurality of sectors, and a plurality of arms each having one end pivotally supported on the base plate so as to pivotally connect and support the sectors through connecting pins to form a parallel link mechanism. Each of the connecting pins has a tapered portion or a flange having a diameter small enough to prevent the action of each sector from being hindered when any of the sectors becomes interposed between any of the remaining sectors or an arm supporting the sector and any of the other sectors. Each of the arms may also have a reduced thickness portion proximate the connecting pin corresponding thereto to thereby prevent movement of the interposed sector from being hindered.

3 Claims, 5 Drawing Sheets

PLANE SHUTTER

FIELD OF THE INVENTION

The present invention relates to a focal plane shutter.

BACKGROUND INFORMATION

As disclosed in Japanese Unexamined Patent Publication No. H7-20534 and Japanese Utility Model Publication No. H6-26897, a typical focal plane shutter comprises two sector groups each having a plurality of sectors supported by arms constituting a parallel link and an opening formed in a shutter base plate is opened or closed by operating the two sector groups. The sectors of the sector groups have connecting pins fixed thereto by caulking, and the sectors are pivotally supported by the arms with the connecting pins pivotally fitting in through-holes drilled through the arms. Further, when the sectors are folded, the outer edge portion of one of the sectors is interposed between one of the arms and another sector supported by the arm at a position close to the connecting pin connecting the arm and the other sector.

A focal plane shutter having the above-described structure has one disadvantage in that when the sector groups are folded, the edge portion of a sector sometimes becomes jammed between one of the arms and another sector connected to the arm through a connecting pin. In view of the recent trend of reducing the thickness and size of the camera to meet an increased demand for weight reduction and increased speed, the space between the adjoining sectors has inevitably become more narrow, resulting in the adverse effect of causing such jamming. That is, a problem has arisen in that during the initial stage of a closing operation of the shutter, the frictional resistance of the jammed sector increases to such an extent that there is a difference in moving characteristics between the in jammed sector and other sectors which are free of such jamming, resulting in a reduction in the exposure performance of the shutter. To solve this problem by reducing the thickness of each of the sectors has, been difficult, however, in view of the requisite high strength and light shielding properties thereof.

SUMMARY OF THE INVENTION

In order to solve the above-described problems, in the focal plane shutter according to the present invention, the sectors and the arms are connected and supported by connecting pins each having a flange portion. Further, the flange portion of each of the connecting pins functions such that it makes each of the arms unable to slip off of the connecting pins, and the flange portion has a diameter small enough to prevent movement of each of the sectors from being hindered when the sectors are folded and any of the sectors becomes interposed between a particular sector and the arm supporting the sector. Alternatively, the flange portion includes a tapered portion for preventing the movement of each of the sectors from being hindered. Further, each of the arms may have a thin portion at least at a position near the connecting pins to prevent the movement of each of the sectors from being hindered. By using any of the above arrangements, all of the sectors can move at a uniform acceleration during the initial stage of operation when the sectors are being opened.

More specifically, in accordance with a first aspect of the present invention, the focal plane shutter comprises a base plate having a shutter opening, groups of opening and closing sectors for opening and closing the shutter opening, a plurality of arms each having one end pivotally supported by and connected to the base plate so as to pivotally connect and support each of sectors of the sector groups and forming a parallel link mechanism, such that when the sectors are folded one of the sectors becomes interposed between another sector and one of the arms adjacent thereto, and a connecting pin for connecting each sector of the sector groups to a respective arm the connecting pin having a flange portion having a diameter small enough to prevent the respective sector from slipping off of the arm and to prevent the movement of each of the sectors from being hindered.

In accordance with a second aspect of the present invention, the flange portion of each of the connecting pins is provided with a tapered portion so that when the sectors are folded and any of the sectors becomes interposed between another sector and one of the arms adjacent thereto, movement of each of the sectors is prevented from being hindered.

Preferably, each of the arms has a thin portion at least at a position near the connecting pin so that when the above-mentioned sectors are folded and any of the sectors becomes interposed between another sector and one of the arms adjacent thereto, movement of each of the sectors is facilitated and prevented from being hindered.

As described above, due to the structure in which each of the connecting pins has a flange portion having a reduced diameter or a tapered portion, or each of the arms supporting the sectors has a reduced thickness portion, movement of each sector is prevented from being hindered when the sectors are opened and even at the initial stage of operation of the shutter all the sectors can move at a uniform acceleration.

DETAILED DESCRIPTION OF THE PREFERRED EMBODIMENTS

Preferred embodiments of the present invention will now be described with reference to the accompanying drawings.

Figure 1:
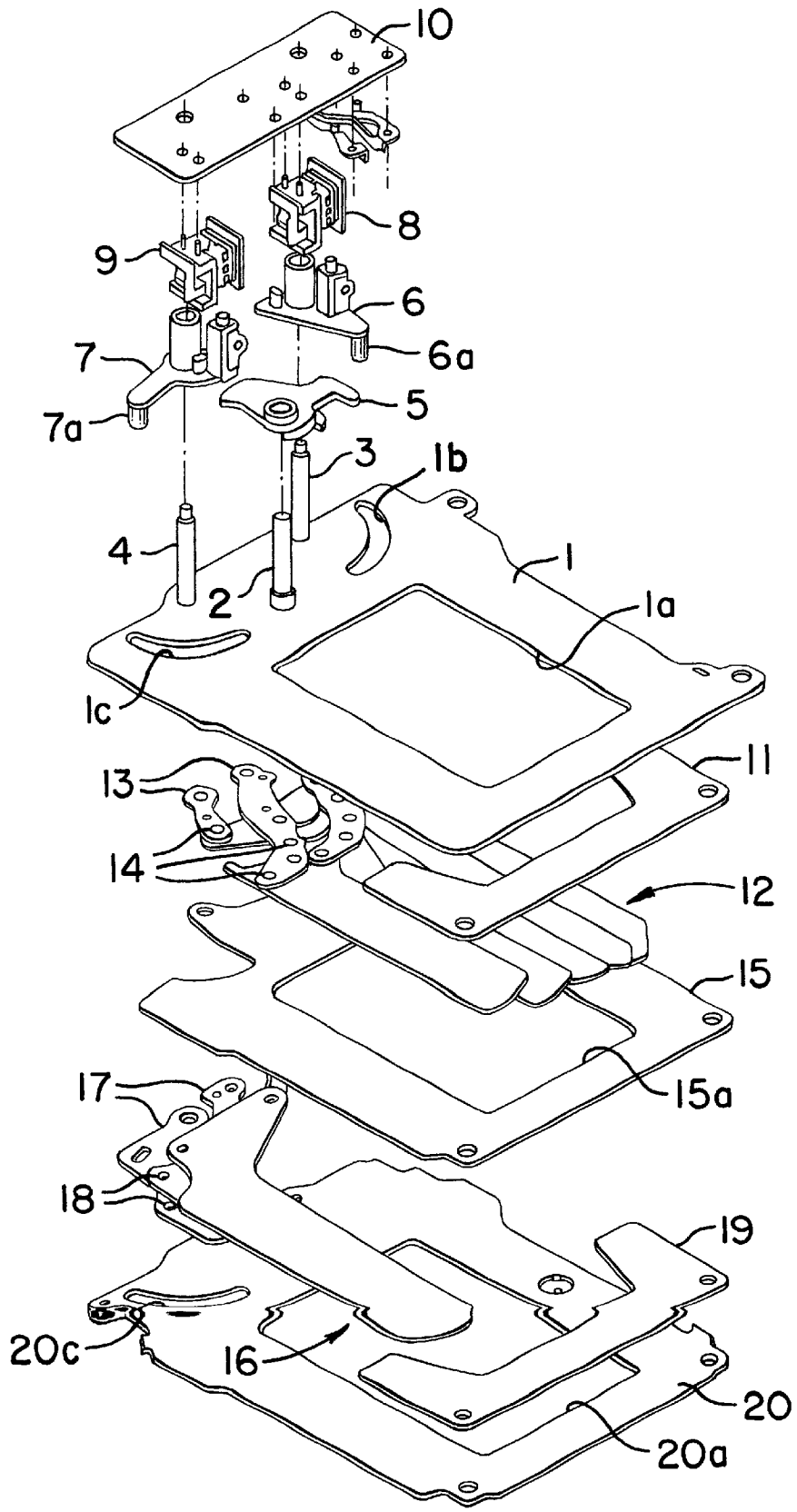
FIG. 1 is an exploded perspective view of a focal plane shutter according to one embodiment of the present invention.

In FIG. 1, a base plate 1 is arranged to face a photographing lens of a camera (not shown) and is provided with a shutter opening 1a. A plurality of shafts 2, 3 and 4 are erected upright on the base plate 1 and a set lever 5, an opening lever 6 and a closing lever 7 are pivotally supported by the shafts 2, 3 and 4, respectively. The shafts 3 and 4 also project from the rear surface of the base plate 1 to pivotally support arms (to be described later). Further, the base plate 1 is provided with circular arc-shaped elongated holes 1b and 1c for the shafts 3 and 4, respectively, and drive pins 6a and 7a fixed to the opening lever 6 and the closing lever 7, respectively, are made movable through these elongated holes 1a and 1b. The set lever 5, the opening lever 6 and the closing lever 7 are respectively connected with drive springs (not shown).

In their set condition, both of the levers 6 and 7 are retained at positions at which they can be attracted by electromagnet devices 8 and 9 by means of the set lever 5 so that when a release button is pressed, the electromagnetic devices 8 and 9 absorb the opening lever 6 and the closing lever 7, the set lever 5 retires by rotating clockwise by the drive spring and the electromagnet devices 8 and 9 are controlled by a control circuit mounted on a circuit substrate 10 so that the opening lever 6 is released from its attracted state first, and after a short time delay, the closing lever 7 is likewise released. After being released, both of the levers 6 and 7 are rotated by the bias force of their own drive springs.

Figure 2A:
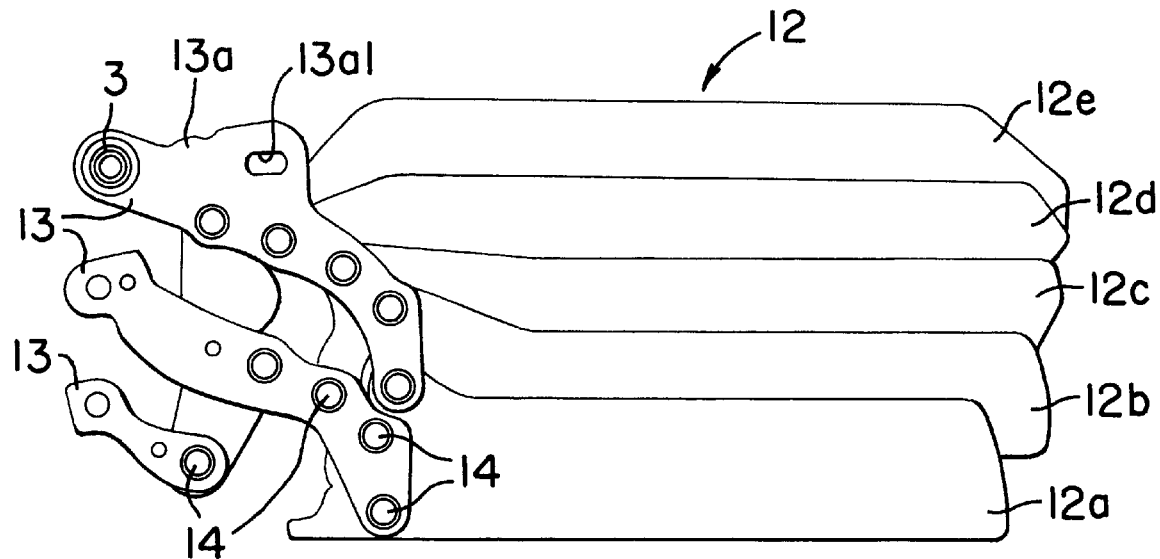
FIG. 2(a) is a front view of an opening sector group of the focal plane shutter of FIG. 1 when the opening sector group is in its set state.

On the rear surface of the base plate 1 there are arranged a sector restraining plate 11 and an opening sector group 12. The opening sector group 12 comprises a plurality of sectors 12a, 12b, . . . , as shown in FIG. 2(a) such that each of the sectors has two connecting pins 14 attached thereto by caulking, and by fitting these connecting pins 14 into a plurality of arms 13 forming a parallel link mechanism, the sectors are pivotally connected to and supported by the arms 13. Further, at the rear surface of the opening sector group 12 there is arranged a partition plate 15 which has a shutter opening 15a.

Figure 3:
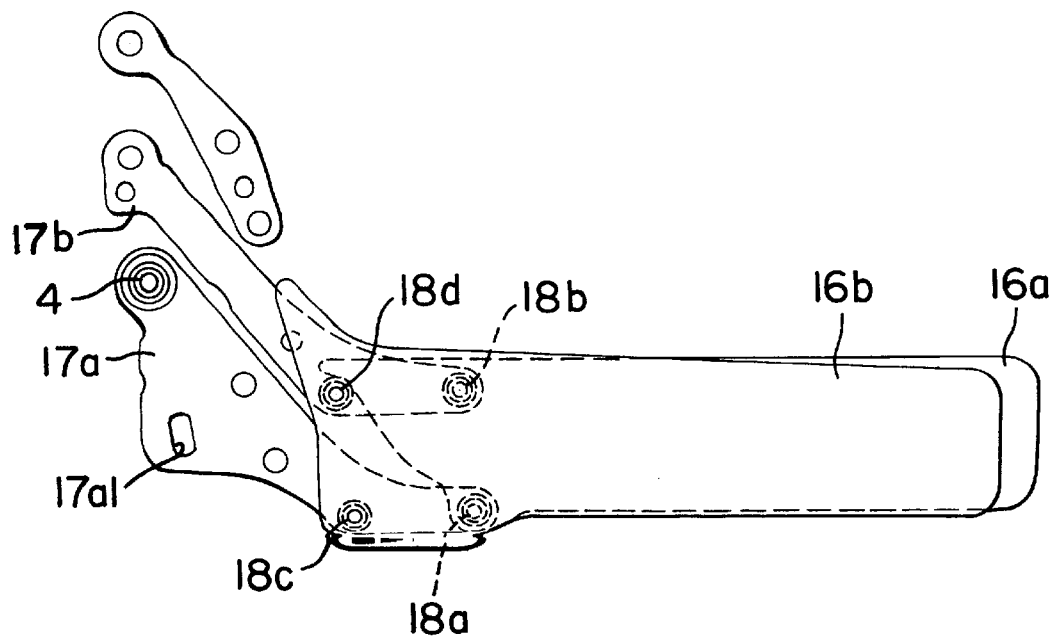
FIG. 3 is a front view of the closing sector group when the closing sector group is in its partly set state.

On the rear surface of the partition plate 15 there is provided a closing sector group 16. The closing sector group 16 comprises a plurality of sectors 16a, 16b, . . . , as shown in FIG. 3 and two connecting pins 18 are fixed to each of the sectors by caulking such that these connecting pins 18 are pivotally fitted in a plurality of arms 17 forming a parallel link mechanism so that the sectors are pivotally connected to and supported by the arms 17. Further, on the side of the rear surface of the closing sector group 16 there is arranged a sector restraining plate 19. Reference numeral 20 designates a sector plate which is provided with a shutter opening 20a. The sector plate 20 is also provided with an elongated hole 20c at a position facing the elongated hole 1c of the base plate 1. It should be noted that when the shutter is assembled into a camera, film (not shown) is located on the rear side of the shutter opening 20a.

FIG. 2(a) shows the opening sector group 12 in its set state. In this state, the sectors 12a, 12b, . . . of the opening sector group 12 are extended and opened to cover the shutter openings 1a, 15a and 20a. The single arm 13a which pivotally connects and supports the sectors 12a, 12b, . . . is pivotally supported by a portion of the shaft 3 projecting from the rear surface of the base plate 1 on which the shaft 3 is erected and a drive pin 6a of the opening lever 6 passes through the elongated hole 1b so as to be connected to a connecting hole 13a1.

Figure 2B:
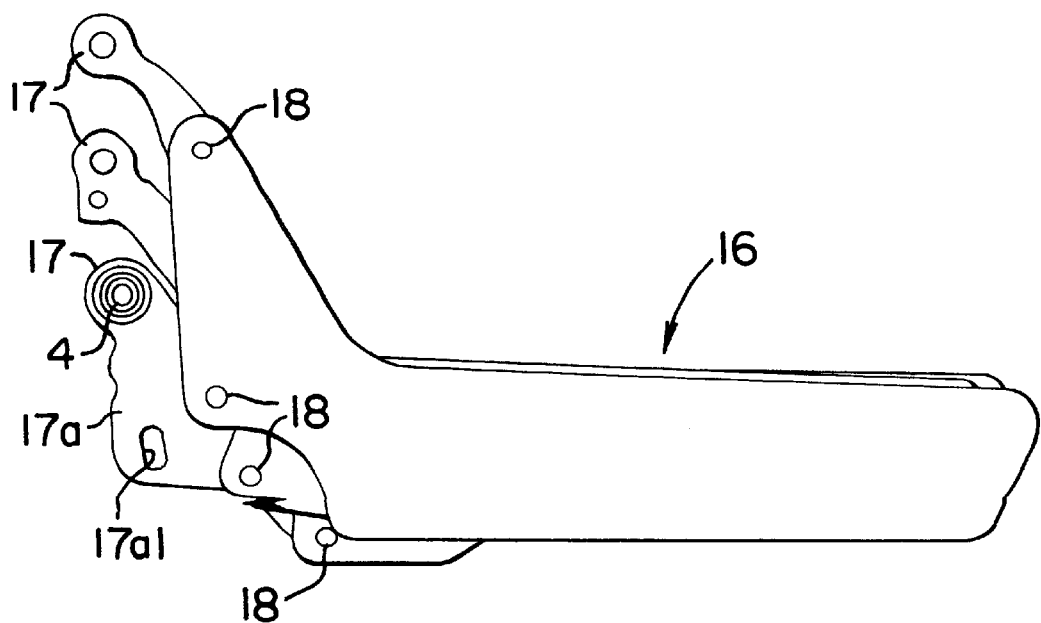
FIG. 2(b) is a front view of a closing sector group of the focal plane shutter of FIG. 1 when the closing shutter group is in its set state.

FIG. 2(b) shows the closing sector group 16 in its set state. In this state, sectors of the closing sector group 16 are retracted and folded to overlap one another at a position deviated from the shutter openings 1a, 15a and 20a. A single arm 17a which pivotally connects and supports the closing sectors is pivotally supported by a portion of the shaft 4 projecting from the rear surface of the base plate 1 on which the shaft 4 is erected, and a drive pin 7a of the closing lever 7 passes through the elongated hole 1c so as to be connected to a connect hole 17a1 with the top end thereof being made movable within the elongated hole 20c.

Figure 4:
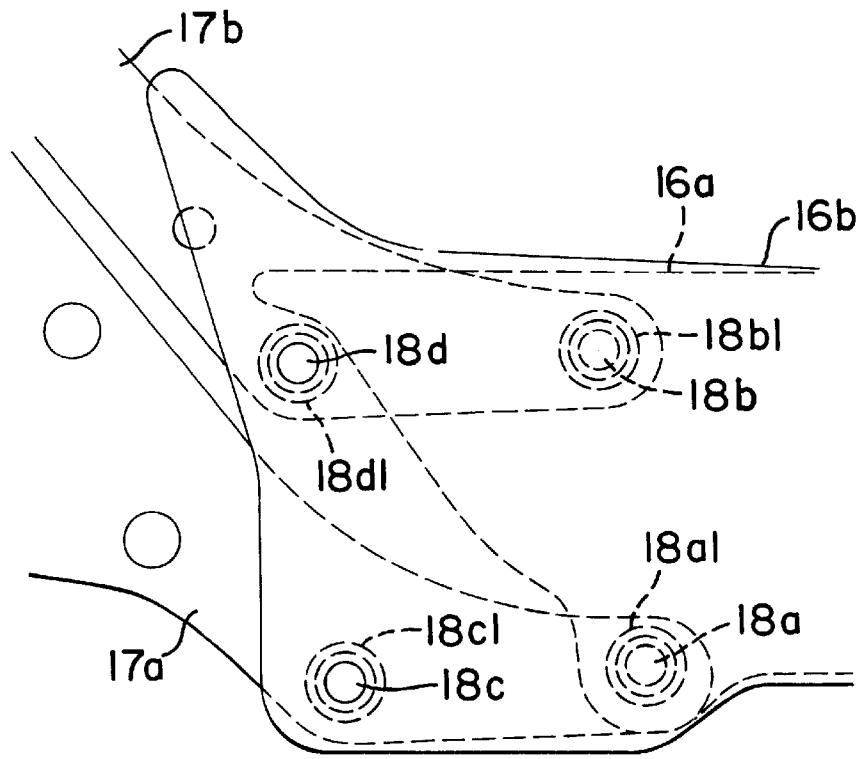
FIG. 4 is an enlarged front view of a portion of FIG. 3.

FIG. 3 shows only two of the adjoining sectors 16a and 16b in a state in which the closing sector group 16 is set, and FIG. 4 shows a partial enlarged view of the sectors in FIG. 3. The sector 16a has the two support or connecting pins 18a and 18b caulked thereto, and these two connecting pins are pivotally fit with the arms 17a and 17b at positions located slightly inward from the top ends of the arms leaving a predetermined space therebetween. The sector 16b has connecting pins 18c and 18d which are pivotally fit with the portions slightly inward from the top ends of the arms 17a and 17b leaving a predetermined space therebetween. Further, the connecting pins 18a, 18b, 18c and 18d are provided with flange portions 18a1, 18b1, 18c1 and 18d1, respectively, so that the arms 17a and 17b are unable to slip off and the sectors 16a and 16b are pivotally connected and supported by the arms 17a and 17b.

Figure 5A:
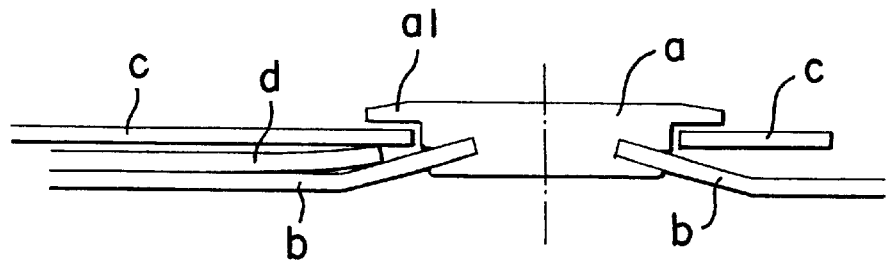
FIGS. 5(a) through 5(d) are enlarged front sectional views, respectively, of a portion around a connecting pin of a conventional shutter and the shutter of the present invention wherein FIG. 5(a) relates to a conventional shutter, FIG. 5(b) relates to a first embodiment of the present invention, FIG. 5(c) relates to a second embodiment of the present invention and FIG. 5(d) relates to a third embodiment of the present invention.
Figure 5B:
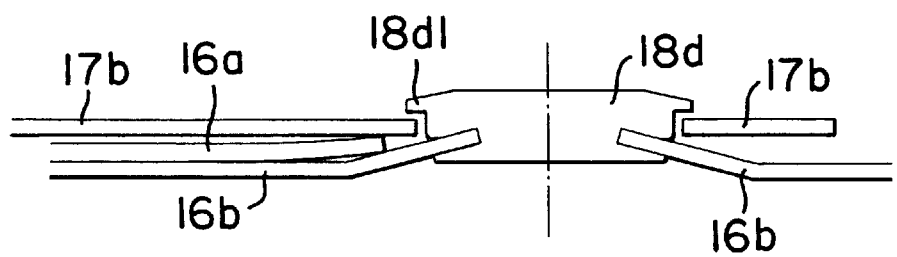
Figure 5C:
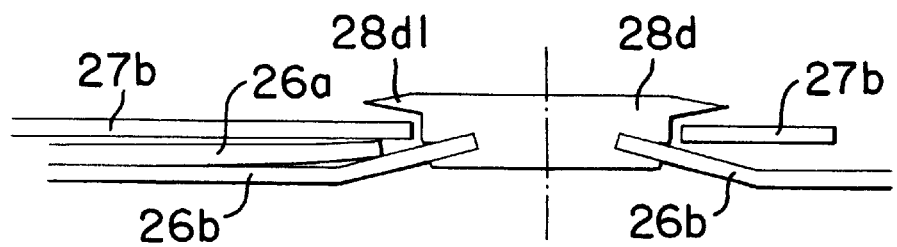
Figure 5D:
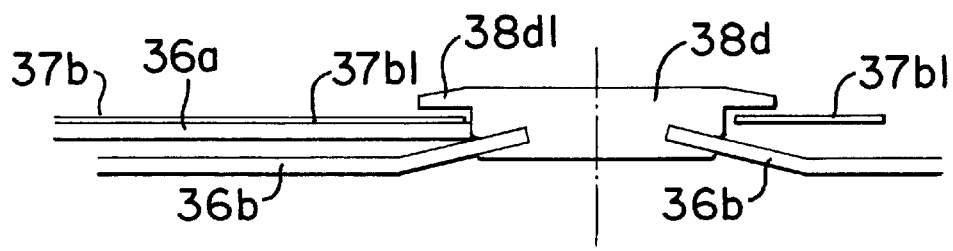
Figure 6A:
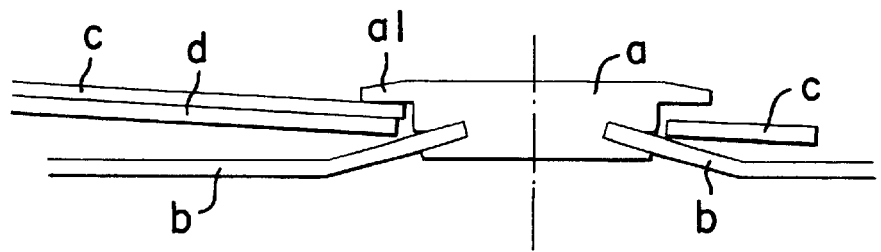
FIGS. 6(a) through 6(d) are enlarged sectional views of a portion around a connect pin especially in a state in which a sector has become extended deeply into a space between another sector and an arm, with the views corresponding to those shown by FIGS. 5(a) through 5(d), respectively.

FIGS. 5(a) through 5(d) and FIGS. 6(a) through 6(d) are sectional views of portions of the arms and the connecting pin 18d shown in FIG. 4, respectively, of which FIG. 5(a) and FIG. 6(a) show typical structures while FIGS. 5(b) through 5(d) and FIGS. 6(b) through 6(d) show structures according to the present invention. Note that in FIGS. 5(a) through 5(d), one sector has not become interposed deeply between another sector caulked to the connect pin and the arm while in FIGS. 6(a) through 6(d), one sector has become interposed deeply between another sector and the arm.

In FIG. 5(a), the sector (b) is caulked to the connecting pin (a), which has a large-diameter flange portion (a1). The arm (c) pivotally fits with the connect pin (a) leaving a clearance therebetween, and another sector (d) is interposed between the sector (b) and the arm (c) as in the case of the present invention. In this case, since the sector (d) does not become interposed deeply between the sector (b) and the arm (c), there is a gap between the flange portion (a1) and the arm (c). However, when the sector (d) becomes deeply interposed as shown in FIG. 6(a), the arm (c) and the sector (d) are forced to enter into the narrow gap between the large-diameter outer periphery of the flange portion (a1) and the sector (b) so that no clearance is provided even by tilting the connecting pin (a), and the arm (c) and the sector (d) are firmly jammed together in the narrow gap. Therefore, as described above, at the initial stage of operation of the shutter when the sectors are opened to close the shutter opening, the starting of the shutter is not performed smoothly due to the jamming. As a result, movement of the sector (d) is hindered to reduce its acceleration and a difference in traveling characteristics from the unjammed sector (b) takes place to thereby lower the exposure performance.

Figure 6B:
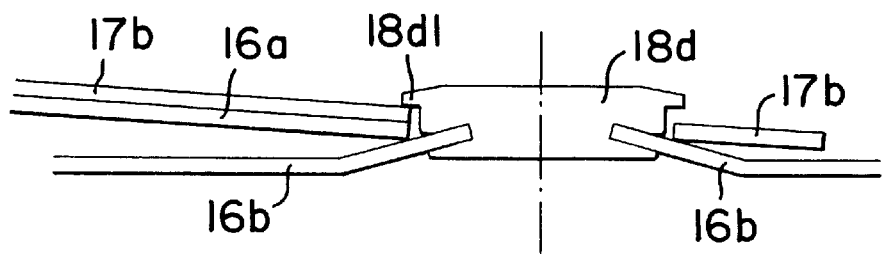

In the case of the present invention, as shown in FIG. 5(b), the sector 16b is caulked to the connecting pin 18d, the arm 17b pivotally fits in the connect pin 18d leaving a gap therebetween, and another sector 16a is interposed between the sector 16b and the arm 17b, as in the case of the typical example shown in FIG. 5(a). In contrast to the structure shown in FIGS. 5(a) and 6(a), however, the flange portion 18d1 of the connecting pin 18d of the present invention has an extremely small diameter as compared to the flange portion a1 of the typical connecting pin (a) shown in FIGS. 5(a) and 6(a) and even when the sector 16a is deeply interposed, as shown in FIG. 6(b), the connecting pin 18d tilts to provide sufficient clearance when the arm 17b and the sector 16a enter between the outer periphery of the small-diameter flange portion 18d 1 and the sector 16b so that they are not jammed together firmly. Consequently, unlike the typical shutter, the action of the jammed sector is not hindered.

Figure 6C:
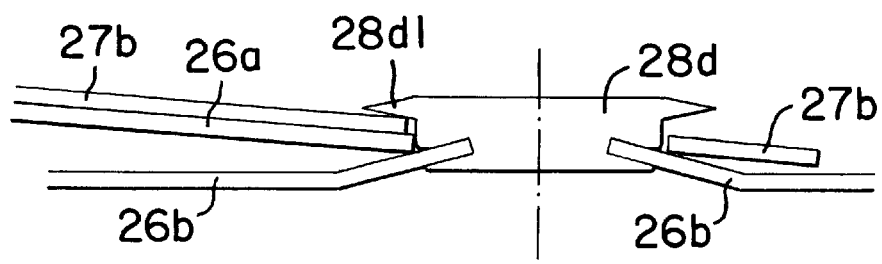

FIG. 5(c) shows a connecting pin 28d according to another embodiment of the present invention. The flange portion of the connecting pin 28d has a tapered portion 28d1 which prevents movement of the sector from being hindered. Therefore, even when the sector 28d1 becomes deeply interposed as shown in FIG. 6(c), the arm 27band the sector 26a not only have clearance due to the existence of the thin portion 28d1 but also have additional clearance by the inclination of the connecting pin 28d so that they are not firmly jammed together and the action of the jammed sector is not hindered.

Figure 6D:
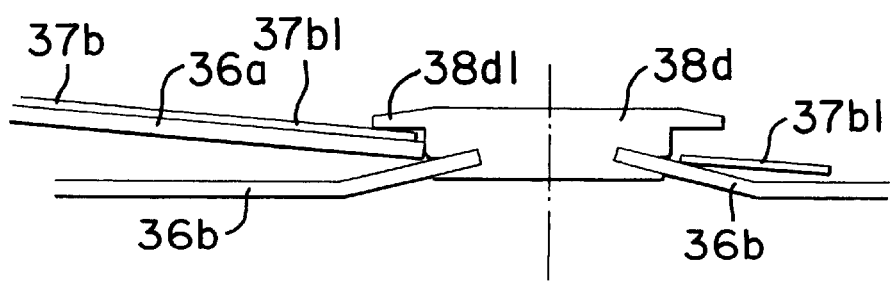

FIG. 5(d) shows a further embodiment of the present invention. The flange portion 38d1 of the connecting pin 38d has a large diameter like that of the typical example but the arm 37b has a thin portion 37b1 at least at a position near the flange portion 38d1 so as to prevent the action of the jammed sector from being hindered. Therefore, even when the sector 36a becomes deeply interposed as shown in FIG. 6(d), the sector 36a not only has clearance due to the existence of the thin portion 37b1 but also has additional clearance by the inclination of the connecting pin 38d so that it does not get jammed firmly, thereby preventing the movement of the sector from being hindered.

It should be noted that the arm 37b may be formed by a thin metal plate in its entirety instead of merely providing a thin portion 37b1 at a position near the flange portion 38d1.

Now, the operation of the focal plane shutter of the present invention having the above-described structure will be described. When the shutter is in its set state, the opening lever 6 and the closing lever 7 are held at positions, respectively, shown in FIG. 1 by the set lever 5. Accordingly, as shown in FIG. 1, the opening lever 6 is at a position to which it has swung in the clockwise direction and the sectors of the opening sector group 12 are fully extended and opened wide to cover the shutter openings 1a, 15a and 20a as shown in FIG. 2(a). Further, the closing lever 7 is at a position to which it has been swung in the clockwise direction while the sectors of the closing sector group 16 are retracted and folded to overlap one another outside the shutter openings 1a, 15a and 20a.

When the release button is then pressed, the set lever 5 is retracted after the attraction of the opening lever 6 and the closing lever 7 by the electromagnet devices 8 and 9, then the electromagnet device 8 is demagnetized and the opening lever 6 moves counter-clockwise due to the force of the spring attached thereto, whereupon the opening sector group 12 moves upward from the state shown in FIG. 2(a) as the opening sectors are gradually folded to release the shutter openings 1a, 15a and 20a.

Along with the opening operation of the opening sector group 12, the electromagnet device 9 is demagnetized after a lapse of a predetermined period of time from the demagnetization of the electromagnet device 8 and the closing lever 7 moves counter-clockwise due to the force of the drive spring attached thereto. With the movement of the lever 7, the closing sector group 16 moves upward as it is gradually opened from the state shown in FIG. 2(b) to thereby cover the shutter apertures 1a, 15a and 20a. In this case, an exposure slit is formed by a slit side (lower side) of the sector 12a (see FIG. 2(a)) of the opening sector group 12 and a slit side (upper side) of the sector 16a (see FIG. 3) of the closing sector group 16 and an image is formed on a film during the time when the exposure slit moves upward to transverse the shutter openings 1a, 15a and 20a. Then, contrary to the state shown in FIG. 2, the opening sector group 12 is retracted from the shutter openings so as to be folded and the closing sector group 16 comes to cover the shutter openings thereby completing the photographing operation.

As described in detail with reference to FIGS. 5 and 6, according to the present invention, in the case of the example shown in FIG. 5(b), the diameter of the flange portion 18d 1 of the connect pin 18d is reduced; in the example shown in FIG. 5(c), the flange portion of the connect pin 28d has a tapered portion 18d 1; and in the example shown in FIG. 5(d), the arm 37b has a thin portion 37b1 so that even in the narrow spaces between the arms 17b, 27b,37b and the closing sectors 16b, 26b, 36b, the slit-forming sectors 16a, 26a and 36a can move smoothly at uniform acceleration from the initial operation stage thereof without getting jammed so that an exposure slit shifts the shutter opening accurately to thereby attain the photographing of a clear and distinct image.

When the film is wound up after the completion of one-frame photography, the set lever 5 is rotated in response to the winding operation to cause the opening lever 6 and the closing lever 7 to rotate clockwise against the forces of the springs attached to the levers 6 and 7. The levers 5, 6 and 7 are held at positions, respectively, to cause the sector groups to be disposed as shown in FIGS. 2(a) and 2(b) and are kept in a stand-by state until the release button is pressed.

The focal plane shutter according to the present invention is provided with connecting pins for connecting and supporting the sectors, and the arms, each of the connecting pins having a flange portion with a reduced diameter or a tapered portion, or each of the arms is made to have a thin portion, such that even when the sectors are folded and one sector becomes interposed in the space between another sector and the related arm, the interposing sector never becomes jammed by virtue of the small-diameter flange portion or the tapered portion of each of the connecting pins and as a result, when the sectors are opened, all the sectors move smoothly without any difficulty and even at the initial stage of operation, they move at uniform acceleration without lowering the exposure performance thereby achieving the photographing of a clear and distinct image.

We claim:

1. A focal plane shutter for a camera, comprising: a base plate having a shutter opening; an opening sector group having a plurality of sectors for opening and closing the shutter opening; a closing sector group having a plurality of sectors for opening and closing the shutter opening; a plurality of arms each having one end pivotally supported on the base plate so as to pivotally connect and support the sectors of the sector groups by forming a parallel link mechanism; and connecting pins for connecting the arms and sectors, each of the connecting pins having a flange portion for preventing the arms from slipping off of the corresponding connecting pins, the flange portion being tapered such that when the sectors are folded and any of the sectors becomes interposed between any of the other sectors or one of the arms and another sector, the interposed sector does not become lammed and movement of each of the sectors is prevented from being hindered.

2. A focal plane shutter for a camera, comprising: a base plate having a shutter opening; an opening sector group having a plurality of sectors for opening and closing the shutter opening; a closing sector group including a plurality of sectors for opening and closing the shutter opening; a plurality of arms each having one end pivotally supported on the base plate so as to pivotally connect and support the sectors of the sector groups; and connecting pins for connecting the arms and sectors; wherein each of the arms has a thin portion at a position proximate the connecting pin attached thereto so that when the sectors are folded and any of the sectors becomes interposed between any of the other sectors or one of the arms and another sector, the interposed sector does not become jammed and movement of each of the sectors is prevented from being hindered.

3. A focal plane shutter according to claim 1; wherein the sectors are provided with through holes for mounting the connecting pins so that when a sector becomes interposed between any of the other sectors or one of the arms and another sector so as to push upward or downward against a respective connecting pin, the connecting pin tilts to prevent the interposed sector from becoming jammed so that movement of each of the sectors is prevented from being hindered.

* * * * *